(12) United States Patent
Yoshida

(10) Patent No.: US 11,500,760 B2
(45) Date of Patent: Nov. 15, 2022

(54) OPERATION MANAGEMENT SERVER, DEVELOPMENT OPERATION SUPPORT SYSTEM, METHOD THEREOF, AND NON-TRANSITORY COMPUTER READABLE MEDIUM STORING PROGRAM THEREOF

(71) Applicant: NEC CORPORATION, Tokyo (JP)

(72) Inventor: Koichi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/494,636

(22) PCT Filed: Mar. 23, 2018

(86) PCT No.: PCT/JP2018/011590
§ 371 (c)(1),
(2) Date: Sep. 16, 2019

(87) PCT Pub. No.: WO2018/174223
PCT Pub. Date: Sep. 27, 2018

(65) Prior Publication Data
US 2020/0394123 A1    Dec. 17, 2020

(30) Foreign Application Priority Data

Mar. 23, 2017 (JP) .............................. JP2017-058051

(51) Int. Cl.
*G06F 9/445* (2018.01)
*G06F 11/36* (2006.01)
*G06F 11/263* (2006.01)

(52) U.S. Cl.
CPC ........ *G06F 11/3664* (2013.01); *G06F 11/263* (2013.01); *G06F 11/368* (2013.01); *G06F 11/3684* (2013.01); *G06F 11/3688* (2013.01)

(58) Field of Classification Search
CPC .. G06F 11/3664; G06F 11/263; G06F 11/368; G06F 11/3684; G06F 11/3688
(Continued)

(56) References Cited

U.S. PATENT DOCUMENTS 7,103,874 B2 * 9/2006 McCollum ................ G06F 8/36
                                              709/220
9,021,458 B1   4/2015 Jacob et al.
(Continued)

FOREIGN PATENT DOCUMENTS

CN    102857371    1/2013
CN    103220163    7/2013
(Continued)

OTHER PUBLICATIONS

Communication dated Jun. 23, 2020, issued by Japanese Patent Office in application No. 2019-507007.
(Continued)

*Primary Examiner* — Chuck O Kendall
(74) *Attorney, Agent, or Firm* — Sughrue Mion, PLLC

(57) ABSTRACT

An operation management server (20) includes: an associating unit (21) configured to associate an updated content of configuration information of a CMDB (30) with a test scenario corresponding to the updated content; a setting unit (22) configured to set a target system (40) according to the updated content of the configuration information of the CMDB (30); and a test executing unit (23) configured to execute a system test on the set target system (40) based on the test scenario associated with the updated content. This configuration provides an operation management server and a development operation support system capable of easily executing a system test, and a method and a program thereof.

9 Claims, 8 Drawing Sheets

(58) Field of Classification Search
USPC .................................. 717/168–178, 120–127
See application file for complete search history.

(56) References Cited

U.S. PATENT DOCUMENTS

| | | | |
|---|---|---|---|
| 9,436,725 B1 | 9/2016 | Aithal et al. | |
| 9,672,066 B2* | 6/2017 | Arun | .................. G06F 9/445 |
| 11,061,707 B2* | 7/2021 | Chastain | ............. G06F 9/45558 |
| 2009/0187596 A1 | 7/2009 | Akiyama et al. | |
| 2011/0316957 A1 | 12/2011 | Sakaue et al. | |
| 2015/0089292 A1 | 3/2015 | Ueda | |
| 2016/0299830 A1 | 10/2016 | Chastain et al. | |
| 2016/0378647 A1* | 12/2016 | Maeoka | .............. G06F 11/3668 717/124 |
| 2018/0060210 A1* | 3/2018 | Pandey | ............... G06F 11/3688 |
| 2018/0095866 A1* | 4/2018 | Narayanan | .......... G06F 11/3684 |

FOREIGN PATENT DOCUMENTS

| | | |
|---|---|---|
| CN | 106155876 | 11/2016 |
| JP | 5-274281 A | 10/1993 |
| JP | 2003-233506 A | 8/2003 |
| JP | 2007-213119 A | 8/2007 |
| JP | 2010-146090 A | 7/2010 |
| JP | 2011-090649 A | 5/2011 |
| JP | 2015-011413 A | 1/2015 |
| JP | 2015-170283 A | 9/2015 |
| JP | 2017-16392 A | 1/2017 |
| WO | 2014/049854 A1 | 4/2014 |
| WO | 2015/045031 A1 | 4/2015 |
| WO | 2015/186219 A1 | 12/2015 |

OTHER PUBLICATIONS

Communication dated Apr. 6, 2020, from the European Patent Office in European Application No. 18770987.8.
Japanese Office Action for JP Application No. 2019-507007 dated Jan. 5, 2021 with English Translation.
European Office Communication for EP Application No. 18770987.8 dated Nov. 18, 2021.
Chinese Office Action for CN Application No. 201880019688.4 dated Sep. 5, 2022 with English Translation.

* cited by examiner

30

MASTER TABLE MT

| No | WORK PATTERN | host | | p1 | |
|---|---|---|---|---|---|
| : | : | : | | : | |
| 15000 | IMPLEMENTATION OF C | X | | 3 | |
| : | : | : | | : | |
| 27000 | IMPLEMENTATION OF C | Y | | 70 | |
| : | : | : | | : | |

Fig. 7

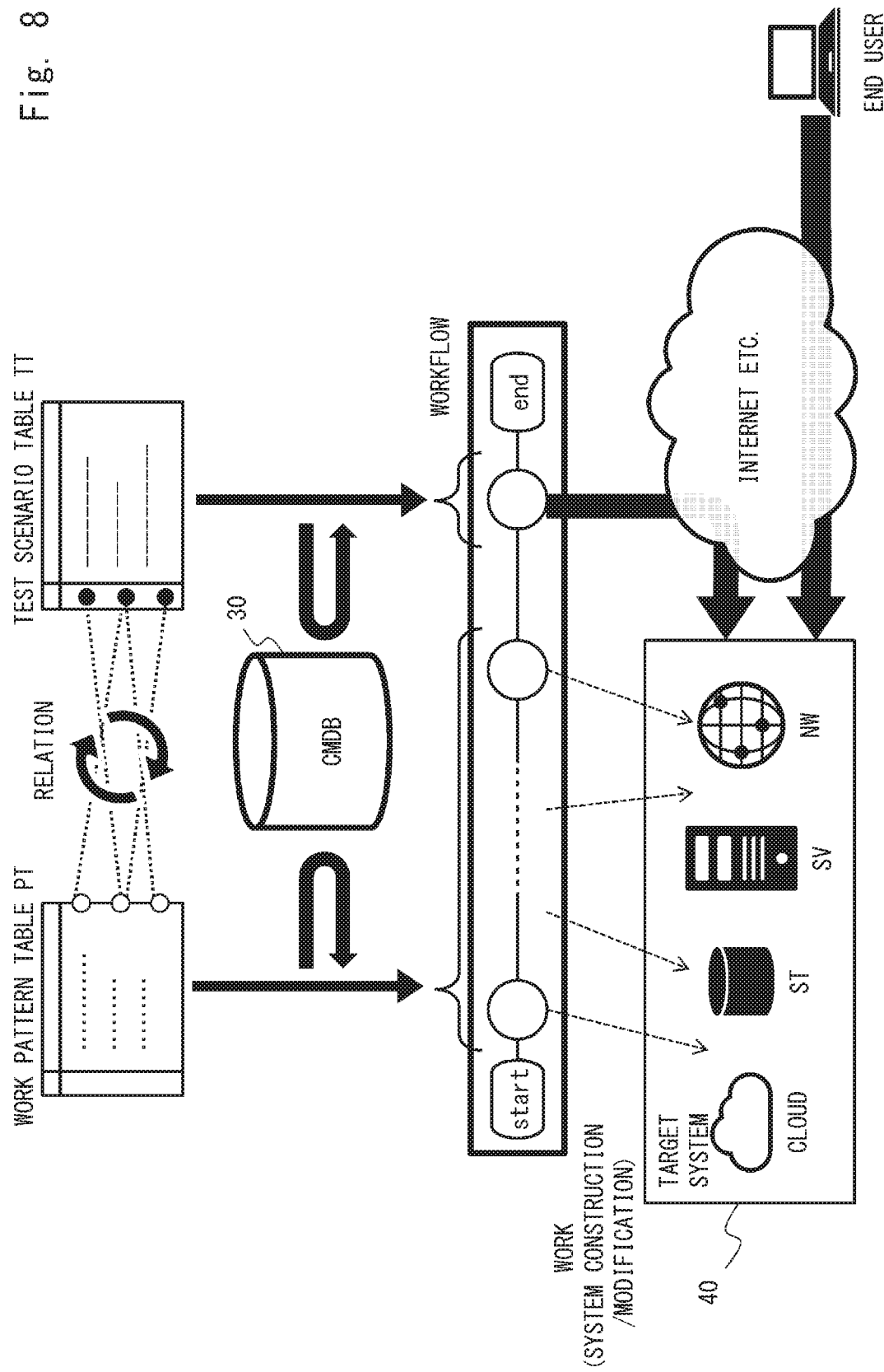

OPERATION MANAGEMENT SERVER, DEVELOPMENT OPERATION SUPPORT SYSTEM, METHOD THEREOF, AND NON-TRANSITORY COMPUTER READABLE MEDIUM STORING PROGRAM THEREOF

CROSS REFERENCE TO RELATED APPLICATIONS

This application is a National Stage of International Application No. PCT/JP2018/011590, filed on Mar. 23, 2018, which claims priority from Japanese Patent Application No. 2017-058051, filed on Mar. 23, 2017, the contents of all of which are incorporated herein by reference in their entirety.

TECHNICAL FIELD

The present invention relates to an operation management server, a development operation support system, and a method and a program thereof, and in particular, to an operation management server and a development operation support system that use a configuration management database, and a method and a program thereof.

BACKGROUND ART

A Configuration Management Database (CMDB) is known as a database for managing configuration information of an Information Technology (IT) system. As one of the methods for performing development (design) and operation of a system using the CMDB or the like, DevOps (Development & Operations) in which cooperation between development and operation is emphasized has received attention. Cooperation between development and operation makes it possible to efficiently perform construction, tests and the like of a system according to the request of a user. Note that work for creating various kinds of information required for system construction is referred to as development or design. Further, information created by development or design is applied to a real system, and work for operating the system (including the subsequent maintenance work) is referred to as operation.

As techniques related to the above method, Patent Literatures 1 and 2, for example, are known. Patent Literature 1 discloses a technique for recording the manufacturing history of products such as commodities, and Patent Literature 2 discloses a technique for performing process management using an RFID tag.

CITATION LIST

Patent Literature

Patent Literature 1: Japanese Unexamined Patent Application Publication No. 2011-090649
Patent Literature 2: Japanese Unexamined Patent Application Publication No. 2010-146090

SUMMARY OF INVENTION

Technical Problem

In recent years, as a system to be developed and operated has become large and complex, it is difficult to recognize a range of influence of updates of the configuration information on the system. Consequently, even if a method such as DevOps is adopted, there is a problem that it is difficult to easily perform a system test. Note that a test for a system to which configuration information is applied (set) is referred to as a system test (or simply a test).

In view of the problems described above, the present invention aims to provide an operation management server and a development operation support system capable of easily executing a system test, and a method and a program thereof.

Solution to Problem

An operation management server according to the present invention includes: an associating unit configured to associate an updated content of configuration information of a configuration management database with a test scenario corresponding to the updated content; a setting unit configured to set a target system according to the updated content of the configuration information of the configuration management database; and a test executing unit configured to execute a system test on the set target system based on the test scenario associated with the updated content.

A development operation support system according to the present invention is a development operation support system including a development management server, an operation management server, and a configuration management database, in which the development management server includes an updating unit configured to update configuration information of the configuration management database, and the operation management server includes: an associating unit configured to associate an updated content of the configuration information of the configuration management database in advance with a test scenario corresponding to the updated content; a setting unit configured to set a target system according to the updated content of the configuration information of the configuration management database; and a test executing unit configured to execute a system test on the set target system based on the test scenario associated with the updated content.

An operation management method according to the present invention includes: associating an updated content of configuration information of a configuration management database with a test scenario corresponding to the updated content; setting a target system according to the updated content of the configuration information of the configuration management database; and executing a system test on the set target system based on the test scenario associated with the updated content.

A development operation support method according to the present invention is a development operation support method in a development operation support system including a configuration management database, the development operation support method including: updating configuration information of the configuration management database; associating an updated content of the configuration information of the configuration management database in advance with a test scenario corresponding to the updated content; setting a target system according to the updated content of the configuration information of the configuration management database; and executing a system test on the set target system based on the test scenario associated with the updated content.

An operation management program according to the present invention causes a computer to execute the following processing of: associating an updated content of configuration information of a configuration management database with a test scenario corresponding to the updated content; setting a target system according to the updated content of the configuration information of the configuration management database; and executing a system test on the set target system based on the test scenario associated with the updated content.

A development operation support program according to the present invention causes a computer to execute the following processing of: updating configuration information of the configuration management database; associating an updated content of the configuration information of the configuration management database in advance with a test scenario corresponding to the updated content; setting a target system according to the updated content of the configuration information of the configuration management database; and executing a system test on the set target system based on the test scenario associated with the updated content.

Advantageous Effects of Invention

According to the present invention, it is possible to provide an operation management server and a development operation support system capable of easily executing a system test, and a method and a program thereof.

BRIEF DESCRIPTION OF DRAWINGS

FIG. 7 is a diagram showing an example of data accumulated in the database according to the first example embodiment; and FIG. 8 is an explanation diagram for explaining a concept of the development operation support system according to the first example embodiment.

DESCRIPTION OF EMBODIMENTS

Basic Example

Figure 1:
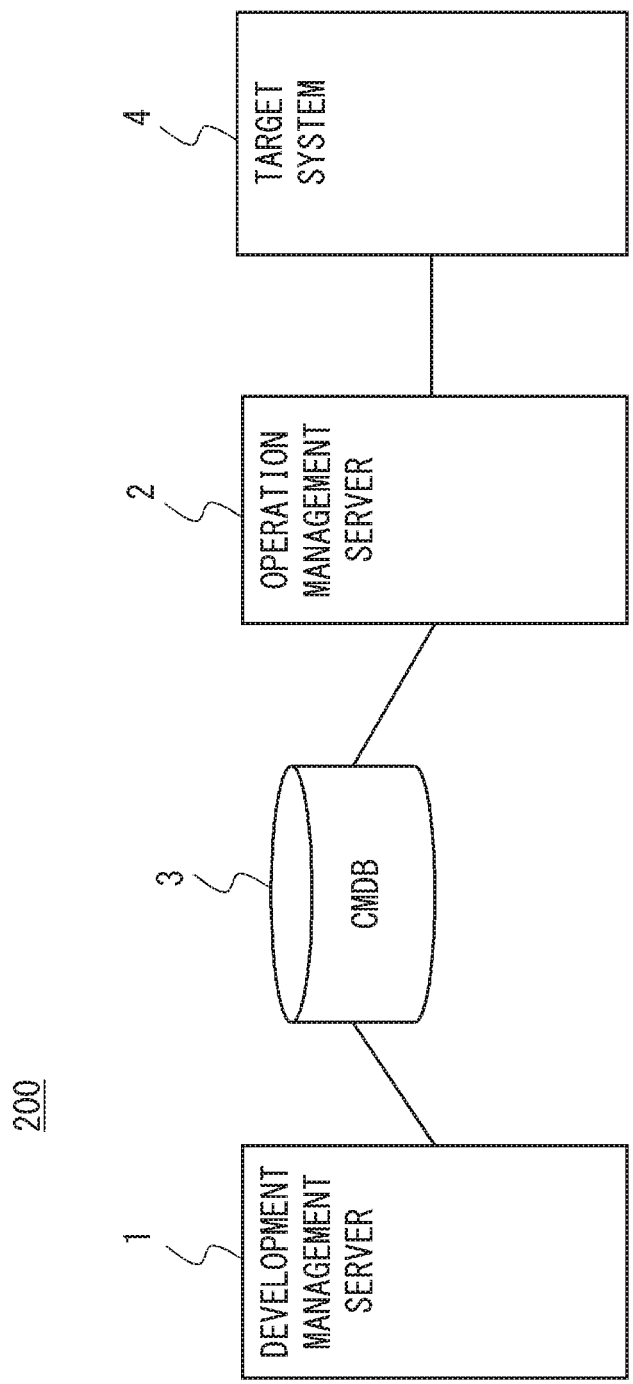
FIG. 1 is a configuration diagram showing a configuration of a development operation support system of a basic example.

Prior to the giving of explanation of an example embodiment, a basic example forming the basis of the example embodiment is described. FIG. 1 shows a configuration of a development operation support system of the basic example. As shown in FIG. 1, a development operation support system 200 of the basic example includes a development management server 1, an operation management server 2, a CMDB 3, and a target system 4.

The CMDB 3 is a database configured to store configuration information of the target system 4. The development management server 1 updates configuration information of the CMDB 3 in accordance with information or the like input from a developer. The operation management server 2 applies the configuration information of the CMDB 3 to the target system 4 in accordance with an instruction or the like input from an operator.

Figure 2:
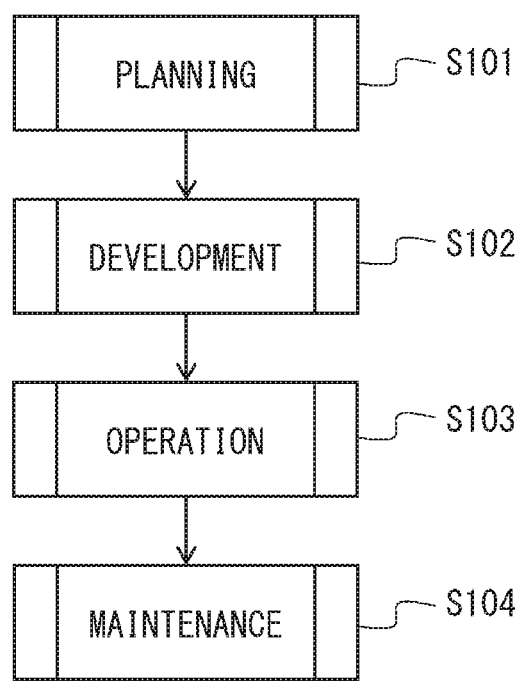
FIG. 2 is a flowchart showing common system development processing.

FIG. 2 shows a flow of common system development processing. As shown in FIG. 2, when an IT system is provided to an end user, the work commonly proceeds in the order of a planning process (S101), a development process (S102), an operation process (S103) and a maintenance process (S104).

In the planning process (S101), a developer (designer) such as a System Engineer (SE) defines requirements in accordance with the request of the end user and determines specifications of the target system 4. For example, after the planning process (S101), the work proceeds using the development operation support system 200 of the basic example.

In the development process (S102), the developer creates (codes) configuration information of the target system 4 in accordance with the specifications of the requirement definition. The developer accesses the development management server 1 using a development terminal or the like, and registers (updates) the configuration information of the target system 4 in the CMDB 3.

In the operation process (S103), the operator accesses the operation management server 2 using an operation terminal or the like, and applies the configuration information of the CMDB 3 to the target system 4. Further, in the maintenance process (S104), the operator accesses the operation management server 2 to monitor a state and address a problem of the target system 4. The operator applies, when constructing, expanding, or modifying the system, the updated configuration information of the CMDB 3 to the target system 4 and then carries out necessary test work.

As described above, it is necessary for the operator to carry out a test of the target system when configuration information of the CMDB is updated. However, configuration information and a system to be tested have become large and complex. For example, as a range of influence of configuration information in the case where the configuration information is updated cannot be simply recognized due to cloud computing, virtualization, platformization and the like, it is difficult to carry out the test. If the test is omitted, it poses a significant risk for a large and complex system.

This causes a problem that a development operation support system like the basic example of FIG. 1 cannot easily perform a test when configuration information is updated.

Outline of Example Embodiment

Figure 3:
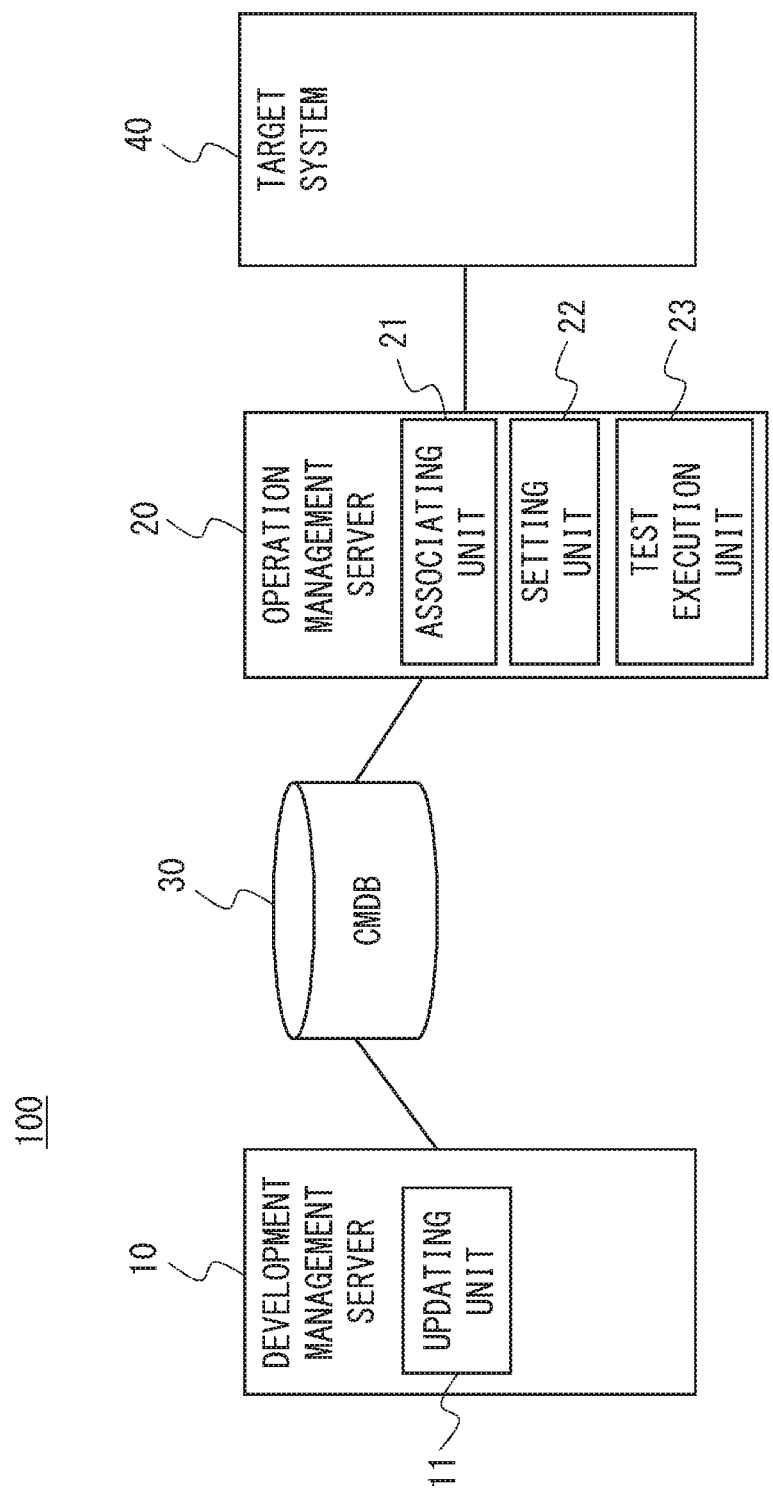
FIG. 3 is a configuration diagram showing a concept of the development operation support system according to an example embodiment.

FIG. 3 shows an outline of the development operation support system according to an example embodiment. As shown in FIG. 3, a development operation support system 100 according to the example embodiment is a system for supporting work of development and operation performed by a developer and an operator, and mainly includes a development management server 10, an operation management server 20, CMDB 30, and a target system 40. The development management server 10 includes an updating unit 11 configured to update configuration information of the CMDB 30.

The operation management server 20 includes an associating unit 21, a setting unit 22, and a test executing unit 23. The associating unit 21 associates an updated content of the configuration information of the CMDB 30 in advance with a test scenario corresponding to the updated content. The setting unit 22 sets the target system 40 in accordance with the updated content of the configuration information of the CMDB 30. The test executing unit 23 executes a system test on the set target system 40 based on the test scenario associated with the updated content of the CMDB 30.

Thus, by associating the updated content of the configuration information with the corresponding test scenario and executing the test based on this association, it is possible to easily perform the test.

First Example Embodiment

Figure 4:
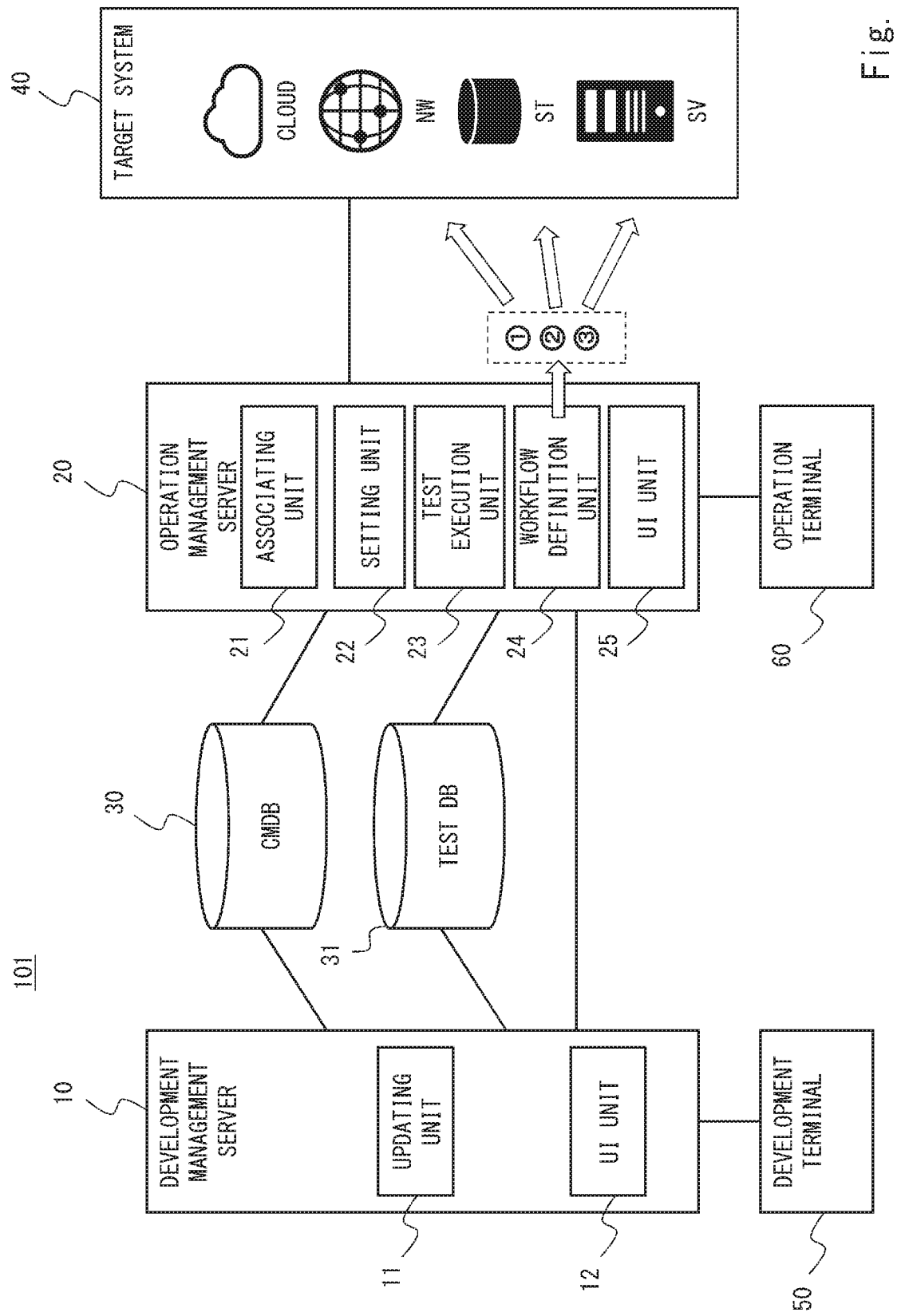
FIG. 4 is a configuration diagram showing a configuration example of the development operation support system according to a first example embodiment.

A first example embodiment is described hereinafter with reference to the drawings. FIG. 4 shows a configuration of the development operation support system according to this example embodiment.

As shown in FIG. 4, a development operation support system 101 according to this example embodiment includes a development management server 10, an operation management server 20, a CMDB 30, a test DB 31, a target system 40, a development terminal 50, and an operation terminal 60. Note that the functions achieved by each of the apparatuses may be achieved by one or any number of apparatuses. For example, the development management server 10 and the operation management server 20 may be a single server apparatus. The development terminal 50 and the operation terminal 60 may be a single terminal apparatus, and the CMDB 30 and the test DB 31 may be a single database apparatus.

The development terminal (design terminal) 50 is a terminal apparatus that enables a developer to perform operations required for development work, and is, for example, a personal computer or the like. The development terminal 50 is communicably connected to the development management server 10 through a network etc., and accesses thereto to input information and the like in accordance with an operation of the developer.

The operation terminal 60 is a terminal apparatus that enables an operator to perform operations required for operation work (including maintenance work), and is, for example, a personal computer or the like. The operation terminal 60 is communicably connected to the operation management server 20 through a network etc., and accesses thereto to input information and the like in accordance with an operation of the operator.

The target system 40 is a system to be developed and operated in the development operation support system 101. The target system 40 may include various IT systems, and includes, for example, a cloud (CLOUD) system, a network (NW) system, a storage (ST) system, and a server (SV) system.

The CMDB 30 is a database that stores configuration information (design information) to be set in the target system 40. The configuration information of the CMDB includes various parameters to be set in the target system 40 and information (such as a source code for an interpreter) on software installed in the target system 40. The CMDB 30 includes, in addition to the configuration information, a work pattern table and the like as described later. Note that the development operation support system 101 may include a work management DB that stores a work pattern table besides the CMDB 30.

The test DB 31 is a database that stores information required for automatically carrying out a test (system test) on the target system 40. The test DB 31 includes, in addition to a test program and test parameters, a test scenario table, a relation table, and the like as described later. Note that it can be considered that the test DB 31 includes a storage unit (database) that stores the test scenario table, the relation table, and the like.

The development management server 10 is a management apparatus that supports and manages development work of a developer, and is, for example, a server computer such as a workstation. The development management server 10 can access (refer to) the CMDB 30 and the test DB 31, and is communicably connected to the operation management server 20.

The development management server 10 includes an updating unit 11 and a User Interface (UI) unit 12. The UI unit 12 is a user interface that receives an input from the development terminal 50 etc., and displays, for example, a Graphical User Interface (GUI), such as a window or an icon, on a display unit of the development terminal 50. The updating unit 11 updates the configuration information (setting information) stored in the CMDB 30 based on information input from the development terminal 50 through the UI unit 12. The updating unit 11 may notify the operation management server 20 that the configuration information of the CMDB 30 has been updated.

The operation management server 20 is a management apparatus that supports and manages operation work of an operator, and is, for example, a server computer such as a workstation. The operation management server 20 can access (refer to) the CMDB 30 and the test DB 31, and is connected to the target system 40 so that it can communicate with (be set in) the target system 40 through a network or the like.

The operation management server 20 includes an association unit 21, a setting unit 22, a test executing unit 23, a workflow definition unit 24, and a UI unit 25. Like the UI unit 12 of the development management server 10, the UI unit 25 is a user interface that receives an input from the operation terminal 60 etc., and displays, for example, a GUI on a display unit of the operation terminal 60.

The workflow definition unit 24 generates or stores a workflow definition in which an operation workflow is described in advance. The workflow definition describes the order of setting work and the order of test work for the target system 40. For example, the workflow definition describes that configuration information is set in or a test is carried out firstly on a cloud system, secondly on a network system, thirdly on a storage system, and fourthly on a server system.

The associating unit 21 associates (relates) a work pattern for the configuration information of the CMDB 30 with (to) a test scenario corresponding to the work pattern. The associating unit 21 associates a work pattern and a test pattern by the relation table of the test DB 31 as described later. An operator (or a developer) sets the association unit 21 in advance to perform association, but the association may be automatically performed based on a history and a result of the tests.

The setting unit 22 sets (applies) configuration information (setting information) stored in the CMDB 30 in (to) the target system 40 based on an instruction input from the operation terminal 60 through the UI unit 25. The setting unit 22 sets each system of the target system 40 in accordance with the workflow definition of the workflow definition unit 24. The setting unit 22 performs setting using various tools (such as a configuration management tool and a virtualization tool) according to the system to be provided. The setting unit 22 can automatically set the target system 40 when the configuration information stored in the CMDB 30 is updated (when the updating unit 11 updates the configuration information).

The test executing unit 23 automatically executes, when configuration information is set in (applied to) the target system 40, a test of the target system 40. The test executing unit 23 refers to the test DB 31 and executes a test based on the test scenario corresponding to the work pattern of the configuration information. Further, the test executing unit 23 executes a test of the target system 40 in accordance with the workflow definition of the workflow definition unit 24. The test executing unit 23 can also execute a test of the target system 40 based on an instruction input from the operation terminal 60 through the UI unit 25. The test executing unit 23 outputs a result of the execution of the test to the operation terminal 60 and the development management server 10.

Figure 5:
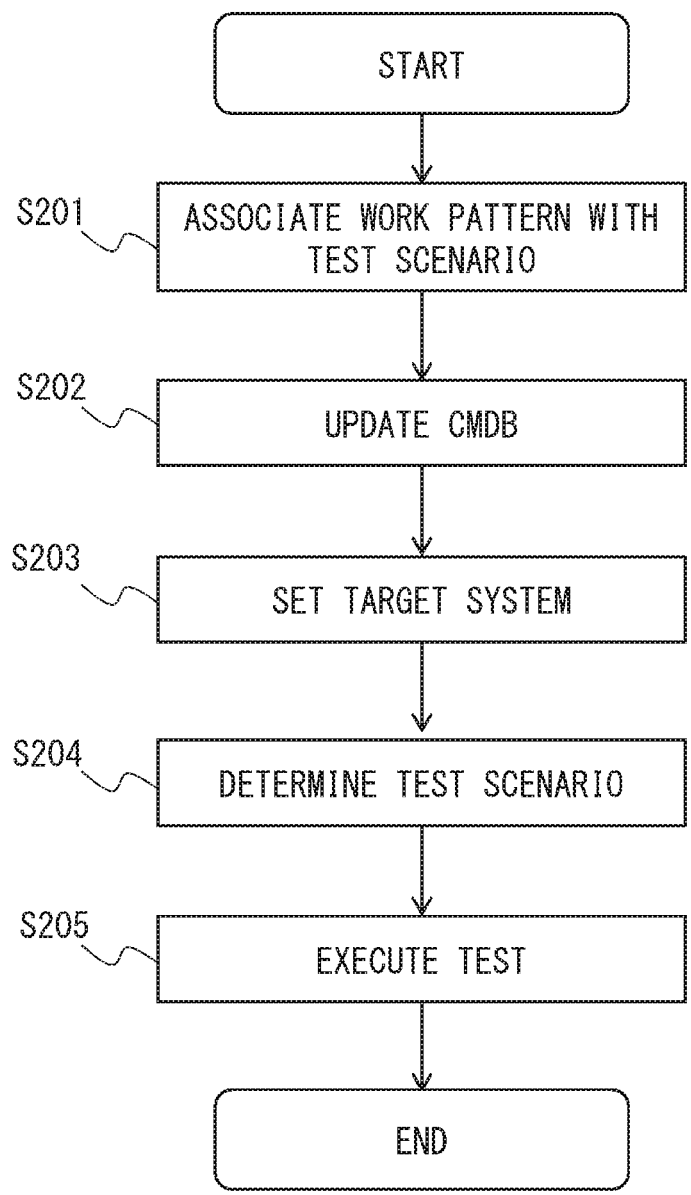
FIG. 5 is a flowchart showing an operation example of the development operation support system according to the first example embodiment.
Figure 6:
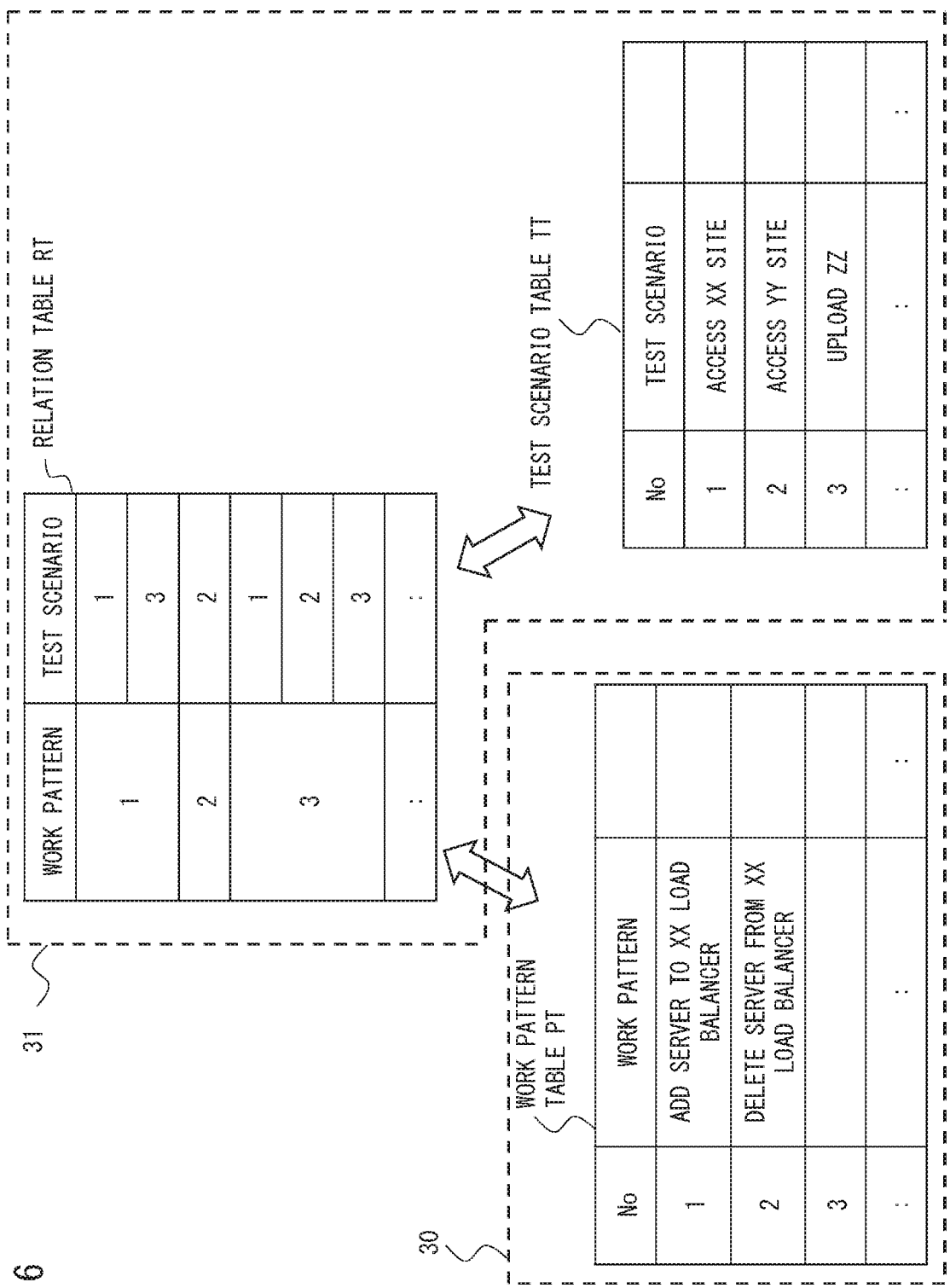
FIG. 6 is a diagram showing an example of data accumulated in a database according to the first example embodiment.

Next, an operation of the development operation support system according to this example embodiment is described using FIGS. 5 to 7. FIG. 5 shows an operation example of the development operation support system according to this example embodiment, and FIGS. 6 and 7 show data examples of the test DB 31 and the CMDB 30 according to this example embodiment.

As shown in FIG. 5, the operation management server 20 associates a work pattern with a test scenario in advance (S201). The associating unit 21 of the operation management server 20 associates (relates) the work pattern for the configuration information of the CMDB 30 with (to) the test scenario corresponding to the work pattern in accordance with, for example, an instruction of an operator. For example, as shown in FIG. 6, the CMDB 30 stores a work pattern table PT, and the test DB 31 stores a test scenario table TT and a relation table RT.

The work pattern table PT (updated content table) stores a list of work patterns (updated contents) for the configuration information of the CMDB 30. The work pattern table PT stores a work pattern and a work pattern No. (identification number) in association with each other. Examples of the work pattern include an addition and deletion of a server to and from a specific load balancer.

The test scenario table TT stores a list of test scenarios to be performed on the target system 40. The test scenario table TT stores the test scenario and the test scenario No. (identification number) in association with each other. Examples of the test scenario include access to a specific site and upload to a specific file.

The relation table RT (association table) relates (associates) a work pattern (updated content) of the work pattern table PT to (with) a test scenario of the test scenario table TT. The association table RT stores the work pattern No. of the work pattern table PT and the test scenario No. of the test scenario table TT in association with each other. The associating unit 21 stores, in accordance with instructions to be input, the work pattern (updated content) and the test scenario related to each other in the relation table RT. Then, the test executing unit 23 determines a test scenario of the test scenario table TT corresponding to the work pattern (updated content) of the work pattern table PT based on the relation table RT. In the relation table RT, the work pattern and the test scenario can be related to each other not only in a one-to-one manner but also in a many-to-many manner. In the example of FIG. 6, the work pattern No.=1 is related to the test scenario Nos.=1 and 3.

Then, the development management server 10 updates the CMDB 30 (S202). The developer designs the target system 40 in accordance with the requirement definition and inputs the designed information to the development management server 10 through the development terminal 50. The updating unit 11 of the development management server 10 updates the configuration information of the CMDB 30 based on the input information. The timing of updating the CMDB 30 may be a development period or an operation (maintenance) period.

For example, as shown in FIG. 7, the CMDB 30 includes a master table MT. The master table MT stores updated latest configuration information, and stores record Nos., work patterns and setting parameters (such as host and p1) in association with one another. The record Nos. indicate identification information identifying the configuration information, the work patterns indicate information corresponding to the work pattern table TP of the test DB 31, and the setting parameters indicate the configuration information to be updated. A plurality of master tables MT are provided in accordance with the target system 40 to be set. For example, a master table MT1 for setting the OS of the server system, a master table MT2 for setting the security of the network system, and a master table MT3 for setting the application of the server system are stored.

Subsequently, the operation management server 20 sets the target system 40 (S203). When the CMDB 30 is updated (or when the time of the application of configuration information comes), the operator instructs the operation management server 20 to set configuration information through the operation terminal 60. The setting unit 22 of the operation management server 20 sets the configuration information stored in the CMDB 30 in the target system 40 according to the input instruction (or automatically at the time of the update or the application). For example, it sets only the updated information of the configuration information of the CMDB 30.

Subsequently, the operation management server 20 determines a test scenario (S204). When the target system 40 is set in S203, the test executing unit 23 of the operation management server 20 refers to the relation table RT of the test DB 31 and then extract a test scenario of the test scenario table TT associated with the work patterns of the CMDB 30 (master table MT) and the work pattern table PT, in order to execute a test corresponding to the work pattern of the set configuration information. In the example of FIG. 6, when the work pattern of the CMDB 30 is the work pattern No.=3, the test patterns of test scenario Nos.=1 to 3 are extracted.

Subsequently, the operation management server 20 executes a test (S205). When the test scenario corresponding to the work pattern is determined in S204, the test executing unit 23 of the operation management server 20 executes a test of the target system 40 based on the determined test scenario. That is, the test scenario of the test scenario table TT selected by the test scenario No. of the relation table RT is executed by the test program. The test executing unit 23 outputs a result of the execution of the test to the operation terminal 60 and the development management server 10. The operation terminal 60 and the development management server 10 (development terminal 50) redo the settings, modify the CMDB, and so on when the result of the execution is abnormal FIG. 8 shows an image of a system to which the present example embodiment is applied. As shown in FIG. 8, in this example embodiment, a work pattern of the configuration information (change work) and a test scenario to be performed (confirmation scenario) are related to each other, the target system is set in accordance with the work pattern, and then a test corresponding to the work pattern is automatically executed (e.g., through the internet). In particular, in this example embodiment, the work patterns and the confirmation scenarios can be related to each other in a many-to-many manner, and by using information of the CMDB centrally managed from both the work and the confirmation, the work patterns and the test scenarios are registered in a series of workflows to automate them.

In this way, a test is automatically executed even when the system is large and complex, and it is thus possible to easily perform a test. Further, performing management by the relation in a many-to-many manner makes it is possible to prevent confirmation omission (including degradation) after work and thus improve the quality. Further, sharing the information of the centralized CMDB makes it possible to prevent a gap between the work object and the confirmation object and thus improve the quality.

Note that the present invention is not limited to the above-described example embodiment, and various modifications can be made without departing from the scope of the invention.

Each configuration in the above-described example embodiment is implemented by hardware or software, or both, and may be implemented by one piece of hardware or software, or a plurality of pieces of hardware or software. The function (processing) of each apparatus may be achieved by a computer including a CPU, a memory, and the like. For example, an operation management program for performing the operation management method in the example embodiment may be stored in a storage device, thereby achieving each of the functions by executing the program stored in the storage device by the CPU.

The above-described programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

INDUSTRIAL APPLICABILITY

The present invention can be used to develop IT systems.

REFERENCE SIGNS LIST 1, 10 Development Management Server
3, 30 CMDB
2, 20 Operation Management Server
4, 40 Target System
11 Updating Unit
12 UI Unit
21 Associating Unit
22 Setting Unit
23 Test Executing Unit
24 Workflow Definition Unit
25 UI Unit
31 Test DB
50 Development Terminal
60 Operation Terminal 100, 101, 200 Development Operation Support System
MT, MT1 to MT3 Master Table
PT Work Pattern Table
RT Relation Table
TT Test Scenario Table

The invention claimed is:

1. An operation management server in a development operation support system for a target system including an Information Technology (IT) system, wherein the development operation support system comprises a configuration management database storing configuration information for configuring the target system, a development management server updating the configuration information stored in the configuration management database, and the operation management server, the operation management server comprising:
one or more memories storing instructions, and
one or more processors configured to execute the instructions stored in the one or more memories to:
associate, in advance before the updating the configuration information by the development management server, a working pattern to be included in the configuration information with a test scenario for the target system corresponding to the working pattern;
set the target system according to an updated content of the configuration information stored in the configuration management database updated by the development management server; and
execute a system test on the set target system based on the test scenario associated with the working pattern included in the updated content of the configuration information stored in the configuration management database.

2. The operation management server according to claim 1, wherein the one or more processors are further configured to execute the instructions stored in the one or more memories to:
refer to the configuration management database configured to store a working pattern table comprising a list of the working patterns, and
refer to a test database configured to store a test scenario table comprising a list of the test scenarios and an association table configured to associate the working pattern in the working pattern table with the test scenario in the test scenario table.

3. The operation management server according to claim 2, wherein in the association table, a plurality of working patterns are associated with a plurality of test scenarios.

4. The operation management server according to claim 2, wherein the one or more processors are further configured to execute the instructions stored in the one or more memories to store, in accordance with an instruction to be input, the working pattern and the test scenario in association with each other in the association table.

5. The operation management server according to claim 2, wherein the one or more processors are further configured to execute the instructions stored in the one or more memories to determine a test scenario of the test scenario table corresponding to the working pattern of the working pattern table based on the association table.

6. The operation management server according to claim 1, wherein the one or more processors are further configured to execute the instructions stored in the one or more memories to set the target system based on workflow information comprising a setting procedure for a plurality of operation systems in the target system.

7. The operation management server according to claim 1, wherein the one or more processors are further configured to execute the instructions stored in the one or more memories to test the target system based on workflow information comprising a test procedure for the plurality of operation systems in the target system.

8. A development operation support system for a target system including an Information Technology (IT) system comprising a development management server, an operation management server, and a configuration management database storing configuration information for configuring the target system, wherein
the development management server comprises:
one or more first memories storing instructions, and
one or more first processors configured to execute the instructions stored in the one or more first memories to update the configuration information stored in the configuration management database, and
the operation management server comprises:
one or more second memories storing instructions, and
one or more second processors configured to execute the instructions stored in the one or more second memories to:
associate, in advance before the updating the configuration information by the development management server, a working pattern to be included in the configuration information with a test scenario for the target system corresponding to the working pattern;
set the target system according to an updated content of the configuration information stored in the configuration management database updated by the development management server; and
execute a system test on the set target system based on the test scenario associated with the working pattern included in the updated content of the configuration information stored in the configuration management database.

9. An operation management method for an operation management server in a development operation support system for a target system including an Information Technology (IT) system, wherein the development operation support system comprising a configuration management database storing configuration information for configuring the target system, a development management server updating the configuration information stored in the configuration management database, and the operation management server, the operation management method comprising:
associating, in advance before the updating the configuration information by the development management server, a working pattern to be included in the configuration information with a test scenario for the target system corresponding to the working pattern;
setting the target system according to an updated content of the configuration information stored in the configuration management database updated by the development management server; and
executing a system test on the set target system based on the test scenario associated with the working pattern included in the updated content of the configuration information stored in the configuration management database.

\* \* \* \* \*